United States Patent
Che et al.

(10) Patent No.: US 10,797,300 B2
(45) Date of Patent: Oct. 6, 2020

(54) REPAIRABLE ELECTROCHEMICAL ENERGY STORAGE DEVICE

(71) Applicant: ENPOWER ENERGY CORP., Nantong, Jiangsu (CN)

(72) Inventors: Yong Che, Jiangsu (CN); Qing Wang, Jiangsu (CN); Yong Zhu, Jiangsu (CN); Weiping Lu, Jiangsu (CN); Xiang Dai, Jiangsu (CN)

(73) Assignee: Enpower Energy Corp., Nantong, Jiangsu (CN)

( * ) Notice: Subject to any disclaimer, the term of this patent is extended or adjusted under 35 U.S.C. 154(b) by 320 days.

(21) Appl. No.: 15/574,649

(22) PCT Filed: May 18, 2016

(86) PCT No.: PCT/CN2016/082507
§ 371 (c)(1),
(2) Date: Mar. 26, 2018

(87) PCT Pub. No.: WO2016/184393
PCT Pub. Date: Nov. 24, 2016

(65) Prior Publication Data
US 2018/0309114 A1 Oct. 25, 2018

(30) Foreign Application Priority Data
May 18, 2015 (CN) .......................... 2015 1 0254355

(51) Int. Cl.
*H01M 4/04* (2006.01)
*H01M 2/40* (2006.01)
(Continued)

(52) U.S. Cl.
CPC .......... *H01M 4/0438* (2013.01); *H01M 2/40* (2013.01); *H01M 4/485* (2013.01); *H01M 4/583* (2013.01);
(Continued)

(58) Field of Classification Search
CPC ... H01M 2/40; H01M 4/0438; H01M 10/4214
(Continued)

(56) References Cited

U.S. PATENT DOCUMENTS

| 7,455,932 B2 | 11/2008 | Fujimoto et al. | |
|---|---|---|---|
| 2014/0272609 A1* | 9/2014 | Nagayama | H01M 2/40 429/403 |
| 2015/0010833 A1* | 1/2015 | Amendola | H01M 4/48 429/406 |

FOREIGN PATENT DOCUMENTS

| CN | 103682476 A | 3/2014 |
|---|---|---|
| CN | 103730677 A | 4/2014 |

(Continued)

OTHER PUBLICATIONS

State Intellectual Property Office of the P.R. China, International Search Report and Written Opinion dated Jul. 28, 2016 for PCT/CN2016/082507 (English translation).
(Continued)

*Primary Examiner* — James M Erwin
(74) *Attorney, Agent, or Firm* — Perkins Coie LLP (57) ABSTRACT

The present invention relates to an aqueous electrochemical energy storage apparatus which comprises an electrochemical energy storage device comprising an electrochemical energy storage device with an inlet and outlet and respectively connected to an external fluid circulation apparatus that facilitates the fluid circulation entering and exiting the said energy storage device, to regulate the physical, chemical, and electrochemical conditions within the said energy storage device. The present invention also relates to a method for optimizing or restoring the electrochemical performance of an energy storage device, enhancing various performance and greatly extending the service life thereof by upgrading the electrolyte inside and outside the energy storage device.

16 Claims, 4 Drawing Sheets

(51) Int. Cl.
  *H01M 10/38* (2006.01)
  *H01M 10/42* (2006.01)
  *H01M 4/485* (2010.01)
  *H01M 4/583* (2010.01)
(52) U.S. Cl.
  CPC ....... *H01M 10/38* (2013.01); *H01M 10/4214* (2013.01); *H01M 10/4242* (2013.01); *H01M 2220/10* (2013.01)
(58) Field of Classification Search
  USPC ....................................................... 429/499
  See application file for complete search history.

(56) References Cited

FOREIGN PATENT DOCUMENTS

| | | |
|---|---|---|
| CN | 103875122 A | 6/2014 |
| CN | 104064824 A | 9/2014 |
| CN | 104103846 A | 10/2014 |
| CN | 104362393 A | 2/2015 |
| JP | H10308232 A | 11/1998 |

OTHER PUBLICATIONS

Chinese First Office Action and Search Report dated Jul. 27, 2018 for Application No. 2018072401942110.

\* cited by examiner

REPAIRABLE ELECTROCHEMICAL ENERGY STORAGE DEVICE

CROSS REFERENCE TO RELATED APPLICATIONS

This application claims the benefit of and priority to Chinese Patent Application No. 201510254355.8, filed on May 18, 2015, the entire contents of which are hereby incorporated by reference.

TECHNICAL FIELD

The present invention relates to an aqueous electrochemical energy storage apparatus and, more particularly, to an electrochemical energy storage apparatus in which the performance can be improved or repairable.

BACKGROUND

With due to the rising demand for energy, fossil energy shortage and its damage to the environment and other factors in our society, the major industrialized countries are in the pursuit of the existing energy system rationalization and efficiency has become an inevitable trend while developing renewable energy like solar and wind vigorously. In order to solve the imbalance of energy production and consumption in time and regions, energy storage technology plays a very crucial role in our sustainable energy future by facilitating renewable energy and improving the energy efficiency for our current electricity systems as well.

Among the existing energy storage technologies, the electrochemical energy storage that using rechargeable battery with high energy efficiency (high energy conversion efficiency) is an ideal option for energy storage. So far, the development of battery technology has not been able to predict such a large-scale (1 kWh-100 MWh) of energy storage needs from residential, commercial, and industrial to power grid. In other words, the existing battery technologies fail to meet the huge market demand for the ideal energy storage program requirements: safety, environmental protection, high efficiency, long life, low cost.

In recent years, the aqueous ion battery technology, including aqueous lithium-ion battery technology (CN1328818C) and aqueous sodium-ion battery technology (CN 102027625 A), is a solution for the current energy storage technology bottlenecks and the market requirements said in the above. Aqueous ion battery uses the theory that the metal ion intercalation/deintercalation which is similar to lithium ion battery, the aqueous electrolyte to replace the non-aqueous (organic) electrolyte of the existing lithium-ion battery, which is flammable and explosive. On top of the safety risks, the cost of electrolytes and the cost of battery production could be greatly reduced by adapting aqueous batteries. In addition, the aqueous battery uses metal oxide and carbon material as the electrode material, a nearly neutral aqueous electrolyte, all the materials used are non-toxic and non-hazardous materials with low environmental footprint, suitable for large-scale energy storage applications and wide integrations. However, the driving force behind the application and integration of energy storage technology is still the cost reduction of energy storage, i.e. LCOE (Levelized Cost of Electricity), which allows users to have economic benefits by storing electricity. For example, in the area where the ladder price is implemented, the electricity in the grid during the valley price period is stored in the energy storage product (battery), and the electricity stored in the battery is used during the peak price period, and the economic benefit can be obtained from the electricity price difference. This requires that the energy storage product has a sufficiently low levelized cost of electricity (LCOE). The most effective way to reduce the cost of electricity is to extend the life of the energy storage products, especially the cycle life of battery.

Any rechargeable battery (secondary battery) has a limited cycle life, the battery capacity will gradually decline as repeated charge and discharge cycles, and different types of secondary batteries have their completely different capacity attenuation mechanism. The invention has the following aspects of the decay mechanism of the aqueous ion battery capacity: 1) the deviation of the pH value of the electrolyte caused by the slight hydrogen evolution and the oxygen evolution reactions; 2) the absence of electrolyte and the accumulation of a small amount of gas due to the slow decomposition of the water in the electrolyte; 3) the by-product of the chemical or electrochemical side reaction of the metal oxide as the electrode active material, resulting in a trace amount of the transition metal ions which are generated and dissolved in the electrolyte; 4) the slow corrosion of metal collector or leads resulting in ions of transition metals dissolving in the electrolyte.

Although the cause of side effects and mechanisms that caused the aqueous battery capacity attenuation in the above are different, the common point is that the byproducts of the side reactions will cause pollution of the electrolyte, and the contaminated electrolyte may decrease the battery capacity.

SUMMARY

In order to solve the technical problems said above, the present invention provides a repairable electrochemical energy storage apparatus with replaceable electrolyte and a method of improving or recovering the performance of the electrochemical energy storage apparatus.

According to one aspect of an embodiment of the present invention, the electrochemical energy storage apparatus comprises an electrochemical energy storage device, which comprises a positive electrode, a negative electrode, a separator, an aqueous electrolyte and a container housing the positive electrode, negative electrode, separator and aqueous electrolyte, wherein, a plurality of said positive electrode and/or negative electrode comprise at least one active material capable of intercalating and deintercalating ions in the aqueous electrolyte; said container has an inlet and an outlet that facilitate circulation of fluid, entering and exiting said container.

In a further embodiment, the inlet and outlet of the container are connected to an external fluid circulation apparatus by which the fluid flows in and out of the said electrochemical energy storage device. The said fluid circulation apparatus comprises a pump, at least one reservoir, and pipes fluidly connecting to said container. The said reservoir may include an up-stream reservoir and a down-stream reservoir. Electric valves are set at the container inlet and outlet for opening and closing the inlet and outlet. In cases, the electric valves are used to control the container inlet and outlet to allow fresh electrolyte flow into the energy storage device from the up-stream reservoir (fresh reservoir) by circulation pump in the external fluid circulation apparatus, and the electrolyte (including trace amount of gases) flow out of the energy storage device and into the down-stream reservoir (waste reservoir). The on/off of the inlet and the outlet can be controlled by the electric valve according to a predetermined period, and the fluid circulation apparatus can be operated periodically with a predetermined period.

In a further embodiment, the electrochemical energy storage apparatus is also provided with a sensor that utilizes its signal to intelligently control the electric valve, automatically actuates the opening and closing of the inlet and outlet of the container as well as the operation of the external fluid circulation apparatus. The intelligent control is based on the conditions of the electrochemical energy storage apparatus detected by the sensors.

The monitoring, modulation or optimization of the physical environment, chemical environment or electrochemical environment within the electrochemical energy storage device can be achieved by the flow of the internal and external electrolytes (including trace amount of gases) of the energy storage device, including the electrolyte supplement and renewal.

The active materials of the negative electrode used in the electrochemical energy storage device of the electrochemical energy storage apparatus of the present invention is selected from the group consisting of transition metal oxides, transition metal phosphates, transition metal sulfates, transition metal carbonates, transition metal silicates, transition metals and transition metal alloys, and one or several kinds of carbon materials with different degrees of graphitization, different specific surface area and different nano-structures and morphologies. The carbon materials may include one or more of graphite, carbon black, activated carbon, carbon fiber, carbon nanotubes and graphene.

The active materials of the positive electrode used in the electrochemical energy storage device of the electrochemical energy storage apparatus of the present invention is selected from the group consisting of transition metal oxides, transition metal phosphates, transition metal sulfates, transition metal carbonates and transition metal silicates, and one or several kinds of carbon materials with various degree of graphitization, different specific surface area and different nano-structures and morphologies. The carbon materials may include one or more of graphite, hard carbon, soft carbon, carbon black, activated carbon, carbon fiber, carbon nanotubes and graphene.

The active materials of the positive and/or negative electrode comprise at least one material that is capable of intercalating and deintercalating ions in aqueous electrolyte, the ions include but are not limited to at least one of $Li^+$, $NH_4^+$, $Na^+$, $K^+$, $Mg^{2+}$, $Zn^{2+}$, $Al^{3+}$ or complex ions formed by metal ions and ligands.

In an alternative embodiment, the active materials of the positive and/or negative electrode may be, for example, transition metal oxide, transition metal phosphate, transition metal sulfate materials In an alternative embodiment, the active materials of the positive electrode and/or negative electrode may comprise a material capable of reversible redox reaction.

In alternative embodiments, the active materials of the positive and/or negative electrodes may comprise materials (e.g. oxides and carbon materials) capable of faradic pseudo-capacitive or non-faradic capacitive reactions.

The aqueous electrolyte used in the electrochemical energy storage device of the electrochemical energy storage apparatus of the present invention may comprise at least one of dissolved lithium salt, ammonium salt, sodium salt, potassium salt, magnesium salt, zinc salt, aluminum salt, or ligand salt. The pH of the electrolyte should generally be in the range of 4-10, preferably from 5 to 9, more preferably from 6 to 8. The aqueous electrolyte may comprise buffer agent stabilizing pH of said aqueous electrolyte.

The electrolyte usually has the characteristics of a neutral aqueous solution. If the electrolyte is deviated from neutral, either acidic or alkaline may induce the hydrogen evolution or oxygen evolution reaction, and may also produce irreversible chemical side reactions with the positive or negative active materials resulting in capacity decay of the energy storage device.

According to another aspect of the embodiment of the present invention, a method for improving or recovering the performance of the said electrochemical energy storage apparatus is provided. The method comprises: using an electric valve to control the on/off of said inlet and said outlet of the container of the electrochemical energy storage device, and using the external fluid circulation apparatus for the fluid entering and exiting the said container, wherein the fluid circulation apparatus comprises a pump, at least one reservoir, and pipes fluidly connecting to said container. The said reservoir may include an up-stream reservoir and a down-stream reservoir. The on/off of the inlet and the outlet can be controlled by the electric valve according to a predetermined period, and the fluid circulation apparatus is operated periodically with a predetermined period.

In a further embodiment, monitoring, modulation, or optimization of the physical environment, chemical environment, or electrochemical environment within the electrochemical energy storage device is achieved by fluid outflow and inflow into the container. Wherein the monitoring, modulating or optimizing the chemical environment inside the electrochemical energy storage apparatus may include controlling the pH of the aqueous electrolyte to the following range: 4-10, or 5-9, or 6-8.

Wherein the fluid flowing out of the container may comprise by-products produced by the electrochemical or chemical side reactions and mixed or dissolved in the aqueous electrolyte, the by-products comprise gas, chemicals dissolved in said aqueous electrolyte, suspended solid particles, and electrolyte (e.g. the electrolyte that deviates from the normal pH) deviates from the pre-determined chemical composition. The fluid flowing out of the electrochemical energy storage device will flow into the down-stream reservoir. The said fluid flowing into said energy storage device comprises said aqueous electrolyte with predetermined composition, deionized water for making up the water loss, additives for maintaining, improving, or recovering the specific physical chemical performances of said electrochemical energy storage device, the fluid flowing into the said energy storage device comes from the up-stream reservoir. In a further embodiment, the method of improving or repairing the performance of the said energy storage apparatus also includes the use of an intelligent control system to control the on/off of the inlet and outlet of the said container and the operation of the fluid recirculation apparatus. Changes in the physical, chemical, or electro-chemical conditions within the said energy storage device are resulted from the opening of the inlet and outlet of the container and the operation of the fluid recirculation apparatus. The fluid circulation can be performed in the formation process of manufacturing the energy storage device, or can be performed on the field of applications during maintaining, recovering, or upgrading the performances of energy storage modules (for example, the battery stack consisting of a plurality of electrochemical energy storage devices) or systems consisting of said energy storage devices. The intelligent sensing system can be controlled according to the state of the said energy storage device detected by the sensor.

According to the further aspect of an embodiment of the present invention, an electrochemical energy storage apparatus is provided. The apparatus comprises at least one electrochemical energy storage device comprising a positive electrode, a negative electrode, a separator, an aqueous electrolyte and a container housing the aqueous electrolyte and a plurality of said negative electrode, said positive electrode, and said separator, wherein said positive and/or negative electrode comprises at least one material capable of intercalating and deintercalating ions in the aqueous electrolyte; said container has an inlet and an outlet that facilitate circulation of fluid entering and exiting said energy storage device.

Since said energy storage device of the said energy storage apparatus of the present invention comprises an inlet and an outlet for liquid circulation in the container, the said energy storage device of the invention can replace the electrolyte to monitor, modulate or optimize and repair the internal physical, chemical or electrochemical environment of the said energy storage device, thus the performance indicators can be greatly improved and the service life can be significantly extended. It is also possible to suppress the development of the capacity attenuation by replacing the electrolyte, and then suppress the specific side effects by adding specific additives to the electrolyte and to repair the material (including the active material and the non-active material) of the said energy storage device. It is also possible to deduce the type and extent of the side reactions by testing the electrolyte composition and so on.

The labels in the drawings are as follows: 1/1a/1b/1c/1d—electrochemical energy storage device, 11—container, 12—inlet, 13—outlet, 14—relief valve, 151—positive terminal, 152—positive omnibus bar, 153—positive current collector, 154—positive electrode active material, 161—negative terminal, 162—negative omnibus bar, 163—negative current collector, 164—negative electrode active material, 17—electrolyte, 18—diaphragm/partition, 21—first control valve/first solenoid valve, 22—second control valve/second solenoid valve, 23—throttle, 31—first pump, 32—second pump, 41—waste reservoir, 42—new reservoir, 43—electrolyte circulation treatment reservoir, 51—pressure sensor, 52—first level sensor, 53—second level sensor, 54—electrolyte electrochemical analyzer, 55—temperature sensor, 61—data collector, 62—management unit, 63—wireless module group, 64—system.

DETAILED DESCRIPTION

The present invention will be said in more details with reference to the accompanying drawings, in which the present invention will become more apparent from the following detailed description when taken in conjunction with the accompanying drawings. It is to be noted that the invention is not limited to the construction and/or arrangement of the devices shown in the drawings, and various combinations of the various embodiments of the invention may be made without departing from the spirit of the invention.

Figure 1:
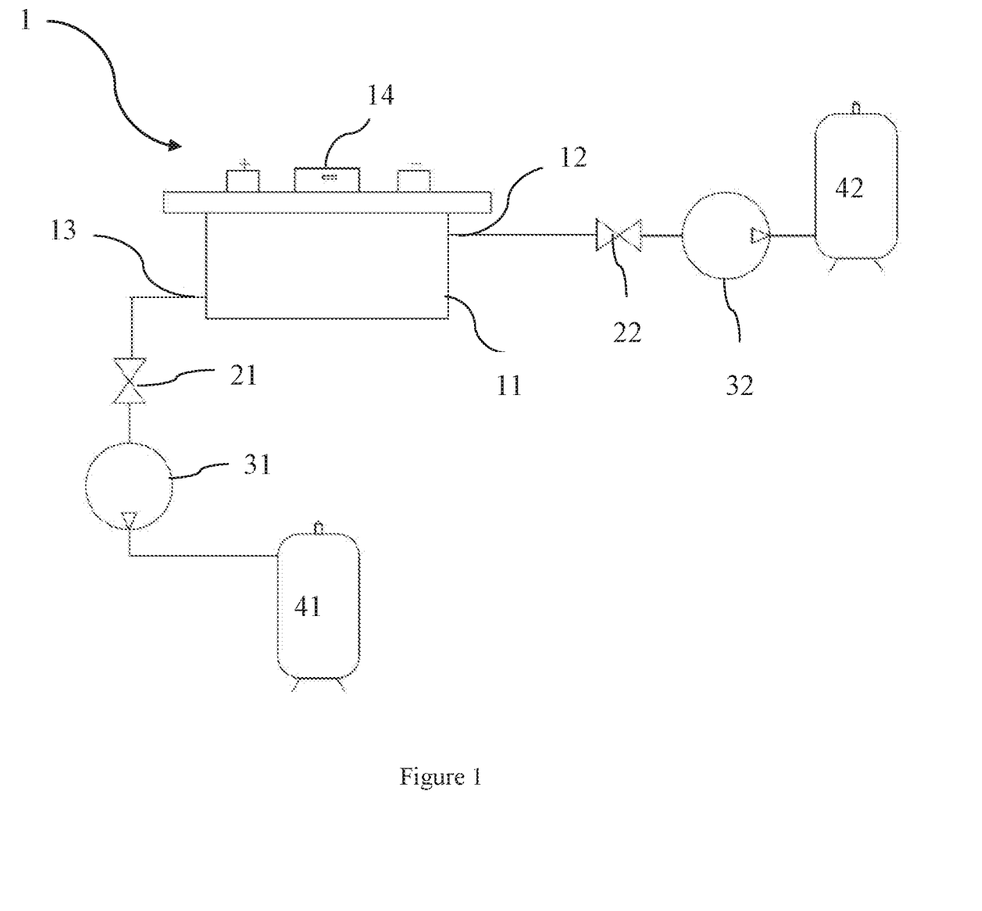
FIG. 1 is a schematic structural view of a repairable electrochemical energy storage apparatus according to one embodiment of the present invention.

FIG. 1 is a schematic structural view of a repairable electrochemical energy storage apparatus according to the embodiment of the present invention. As shown in FIG. 1, the said energy storage apparatus of the present embodiment includes an electrochemical energy storage device 1 (for example, the aqueous ion battery) comprising a positive electrode, a negative electrode, a separator and an aqueous electrolyte, and the container 11 housing positive electrode, negative electrode, separator and aqueous electrolyte. The container 11 has inlet 12 and outlet 13 for fluid circulation. The container 11, preferably, the inlet 12 and the outlet 13 of the container 11 may be connected to an external fluid recirculation apparatus to allow the fluid to flow out and into the said energy storage device 1. The fluid circulation apparatus may include circulation pump (e.g., the first pump 31 and the second pump 32), reservoir and connection line as the fluid passage. The reservoir may include an up-stream reservoir (new reservoir 42) and a down-stream reservoir (waste reservoir 41). The said energy storage device may also include control valves (e.g., the first control valve 21 and the second control valve 22) provided at the inlet 12 and the outlet 13 of the container 11 for controlling the on/off of the inlet 12 and outlet 13. In FIG. 1, the liquid outlet 13 of the container 11 is connected to the waste reservoir 41 through the first control valve 21 and the first pump 31, and the liquid inlet 12 of the container 11 through the second control valve 22 and the second pump 32 is connected to the new liquid reservoir 42. After the said energy storage device keeps operating for a certain time (for example, 100 consecutive days), the first control valve 21 and the first pump 31 connected to the waste reservoir 41 can be opened to extract the electrolyte in the electrochemical energy storage device 1, and then open the second control valve 22 and the second pump 32 that connected to the new reservoir 42, clean the electrochemical energy storage device 1 for 1 to 3 times with fresh electrolyte, then fill the said energy storage device 1 with the fresh electrolyte. At this point, the simplest repair of the said energy storage device is completed. Before and after the electrolyte change, the capacity of the said energy storage device can be improved at different degrees.

The capacity of the electrochemical energy storage device may be attenuated due to irreversible side reactions that undesirable during its charge-discharge cycle, including chemical and electrochemical side reactions. The byproducts produced by these side reactions may include gases, chemicals dissolved in said aqueous electrolyte or suspended solid particles. The presence of such by-products and their accumulation in the said energy storage device will accelerate the decay of the capacity and other performances of the energy storage device. In the present invention, the monitoring, modulation or optimization of the physical environment, chemical environment or the electrochemical environment within the electrochemical energy storage apparatus can be achieved by the fluid flowing out of and into the container. The physical environment includes, but is not limited to, pressure and temperature; the said chemical environment includes, but is not limited to, the pH of the electrolyte, the oxygen concentration dissolved in the electrolyte, the composition of the electrolyte including the concentration of cation and anion, and the concentration proportion of different metal cations, etc. The electrochemical environment includes, but is not limited to, the conductivity of the electrolyte, the electrochemical potential window of the electrolyte, the electrochemical corrosion and corrosion state of the metal collector.

For example, in the present embodiment, the inlet 12 and the outlet 13 of the device 1 can be opened periodically or irregularly to activate the liquid circulation and by which the electrolyte contaminated by the side reaction product including the gas, chemicals dissolved in said aqueous electrolyte, which deviates from the predetermined pH, flows out of the energy storage device 1 into the waste reservoir 41. At the same time, the electrolyte with predetermined composition, including additives etc., can flow from the new reservoir 42 into the electrochemical energy storage device 1 to improve the physical, chemical and electrochemical environment within the energy storage device, and optimize and repair its electrochemical properties.

The fluid circulation apparatus in the present embodiment is not always in the activated state, and the liquid inlet 12 and the liquid outlet 13 of the device 1 can be opened according to a predetermined period and the fluid circulation apparatus can be activated. That is, the control valve opens and closes the inlet and the outlet according to a predetermined period, and the operation of the fluid circulation apparatus is operated according to a predetermined period. For example, multiple charge-discharge cycles of the energy storage device may be set as a predetermined cycle, for example, the electrical cycle is a predetermined cycle for 300 weeks, the other number of cycles may be set as a predetermined cycle, or another number of the cycle can be set to a predetermined cycle as needed. During each charge-discharge cycle of the energy storage device, the opening of the inlet and outlet is controlled through the control valve provided at the inlet and outlet of the container, and at the same time, the fluid circulation apparatus is activated to allow the byproducts-contaminated electrolyte to flow into the waste reservoir 41 from the energy storage device 1, and the electrolyte with a predetermined composition to flow into the electrochemical energy storage device 1 from the new reservoir 42. Then through the control valve to close the inlet and outlet and stop the fluid circulation apparatus.

For example, the fluid flowing out of the container 11 may comprise by-products produced by electrochemical or chemical side reactions mixed or dissolved in the aqueous electrolyte, the by-products include gas, chemicals dissolved in said aqueous electrolyte, suspended solid particles, and the electrolyte deviates from the pre-determined chemical composition (e.g. electrolyte that deviates from the pre-determined pH). The fluid flowing out of the electrochemical energy storage device 1 will flow into the waste reservoir 41. The fluid flowing into the said energy storage device 1 may comprise an aqueous electrolyte with predetermined chemical composition, deionized water for making up the water loss, and additives for maintaining, improving, or recovering the specific physical chemical performances of said electrochemical device, the fluid flowing into the electrochemical energy storage device is from new reservoir 42.

For example, the predetermined chemical composition refers to the one that enables the electrolyte to be in a normal working state, for example, including but not limited to the pH of the electrolyte, the concentration of oxygen dissolved in the electrolyte, the composition of the electrolyte in the electrolyte, including concentration of anion and cation, the concentration ratio of different metal cations and the like, as well as the conductivity of the electrolyte and the electrochemical potential window of the electrolyte.

Figure 2:
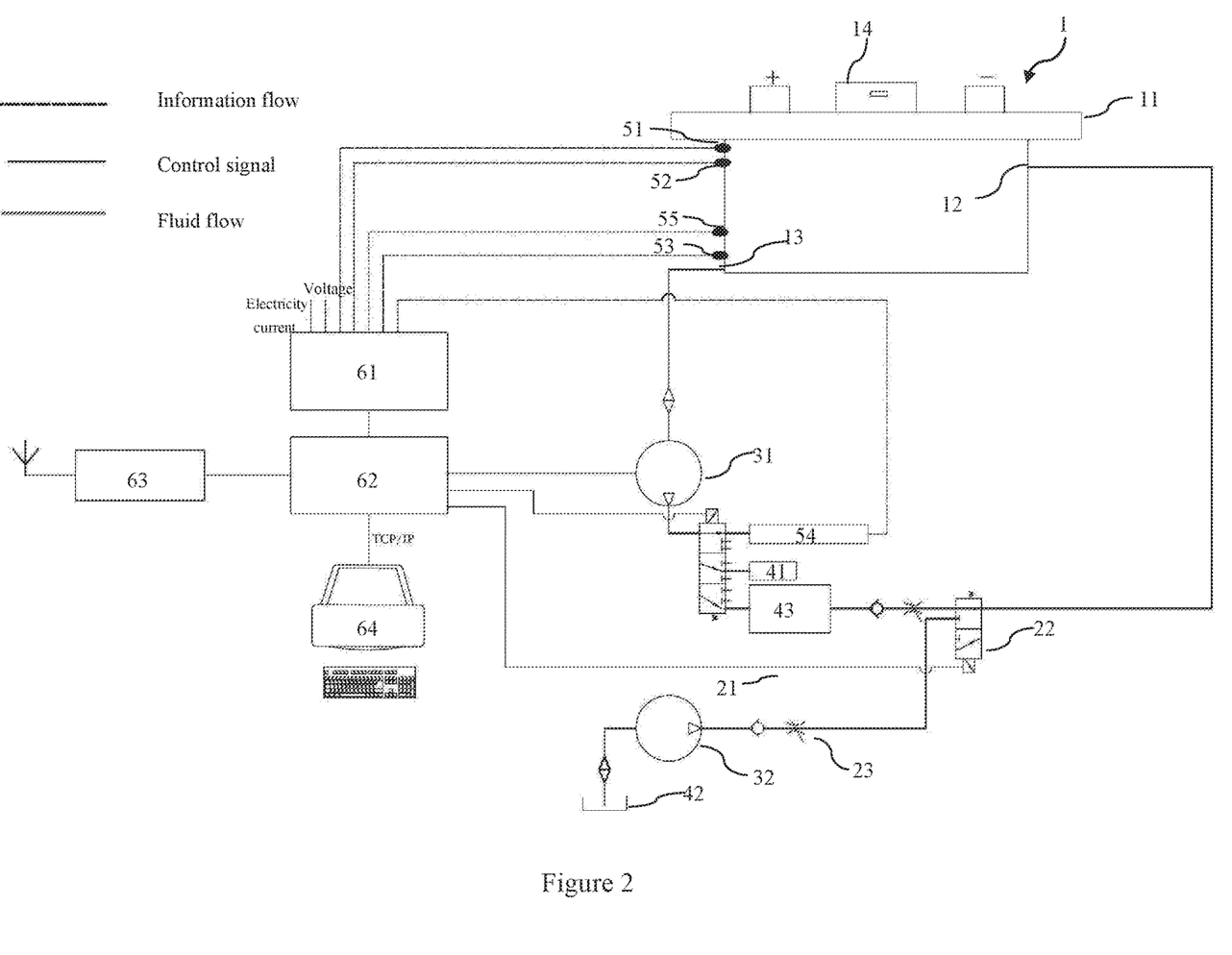
FIG. 2 is a schematic structural view of a repairable electrochemical energy storage apparatus according to another embodiment of the present invention.

FIG. 2 is the schematic structural view of a repairable electrochemical energy storage apparatus according to another embodiment of the present invention. As shown in FIG. 2, compared with the structure of the electrochemical energy storage device of the previous embodiment, the difference is that the electrochemical energy storage apparatus of the present embodiment may include sensor and intelligent control system, and may be controlled by a signal of the sensor. The valve is controlled intelligently, and the intelligent control system controls the on and off of the inlet 12 and the outlet 13 of the container 11 and the operation of the external fluid circulation apparatus, so as to automatically repair the electrochemical energy storage device.

In the present embodiment, the fluid circulation apparatus is not always on. The intelligent control is based on the state of the electrochemical energy storage device detected by the sensor.

The sensor is used to detect the state of the electrochemical energy storage device, for example, the physical and chemical environment, or the electrochemical environment within the said energy storage device. Preferably, the sensor may include: ① a pressure sensor 51 (timely monitoring) provided at the electrochemical energy storage device 1; ② a temperature sensor 55 (timely monitoring) provided at the electrochemical energy storage device 1; ③ a first level sensor 52 provided at the upper part of the energy storage device 1 and a second level sensor 53 (timely monitoring) provided at the lower part of the electrochemical energy storage device 1; ④ an electrolyte electrochemical analyzer 54 (for periodic liquid testing, the workflow is a control unit (not shown) for the first pump 31, and the first pump 31 extracts a quantitative electrolyte to the electrochemical analyzer for verification).

Preferably, the intelligent control system may include a data collector 61 and a management unit 62. The data collector 61 may read the data stream from the sensor and analyze it, and may pass the analysis results to the management unit 62 in the form of information streams. The management unit 62 may give work instruction (control signal) to the fluid circulation device according to the received analysis result, wherein the analysis result may include, for example, deterioration of the electrolyte exchange of the electrolyte; or abnormal temperature and pressure inside the electrochemical energy storage device which means the activity of electrolyte may be not enough and the need for an electrolyte circulation to enhance the activity of the electrochemical energy storage device; or short of the electrolyte which needs to make up and so on.

Preferably, the electrochemical energy storage apparatus may also include a wireless module group 63 to implement monitoring and remote management functions. For example, a wireless module group 63 is provided to support intelligent mobile devices such as APPLE systems (e.g. Iphone or Ipad) and Android systems for online monitoring. Moreover, the Internet remote monitoring and management of the system 64 can be achieved by the TCP/IP protocol.

As shown in FIG. 2, the workflow of the electrochemical energy storage apparatus includes the following steps:

The first step: the data collector 61 reads and analyzes the data got by detection sensor from the electrochemical energy storage device, and transmits the analysis result to the management unit 62.

The second step: the management unit 62 receives the analysis result.

The third step: the management unit 62 gives work instruction (control signal), the execution flow is as follows:

If the electrolyte is deteriorated, the first pump 31 will get instruction to extract the electrolyte from the management unit 62 at the very first, the first solenoid valve is instructed to move to the Position-2, the electrolyte is pumped into the waste liquid reservoir 41, and the management unit 62 stops the first pump 31 from operating according to the signal from the first level sensor 52, the second pump 32 is instructed to start operation, the fresh electrolyte (electrolyte with predetermined composition) is extracted from the new liquid reservoir 42, and the second solenoid valve 22 is commanded to move to the Position-2 and the second pump 32 extracts fresh electrolyte for the electrochemical energy storage device 1, and the management unit 62 stops the operation instruction to the second pump 32 based on the signal of the first liquid level sensor 52.

When the electrolyte is subjected to the fluid circulation to enhance activity, the first pump 31 is instructed to start operation with instruction from the management unit, the first solenoid valve 21 is instructed to move to the Position-3, the second solenoid valve 22 is in the default Position-1, the electrolyte flows back to the electrochemical energy storage device 1 after passing through the circulation reservoir 43 until the management unit stops providing the work instruction;

If the liquid level of the electrolyte is very low and supplement is needed, the second pump 32 is instructed to start the operation to extract the fresh electrolyte while the second solenoid valve 22 is commanded to move to the Position-2 and the fresh electrolyte extracted by the second pump 32 is supplemented to the electrochemical energy storage device 1, the management unit 62 stops the operation instruction to the second pump 32 according to the signal of the second level sensor 53.

As said in the above, in the present embodiment, the state of the energy storage device can be monitored by the sensor, and the inlet and outlet of the said device can be opened and the fluid circulation apparatus can be activated according to the monitoring result, by which the electrolyte contaminated by the side reaction products, including the gas, chemicals dissolved in said aqueous electrolyte, i.e. the electrolyte deviates from the pre-determined chemical composition (e.g. the pre-determined pH), flows out of the energy storage device 1 and into the waste liquid reservoir 41. At the same time, the electrolyte with a pre-determined chemical composition, including additives, etc., can flow from the fresh liquid reservoir 42 into the electrochemical energy storage device 1, to improve the physical, chemical and electrochemical environment within it, and optimize and repair its electrochemical properties.

In other alternative embodiments, changes in the physical, chemical, or electrochemical conditions within the said energy storage device 1 resulted from the opening of the inlet 12 and outlet 13 of the container and the operation of the fluid circulation apparatus can be performed in the formation process of manufacturing the energy storage device 1, or can be performed on the field of applications during maintaining, recovering, or upgrading the performances of energy storage modules (for example, the battery stack consisting of a plurality of electrochemical energy storage devices) or systems consisting of said energy storage devices 1.

Figure 3:
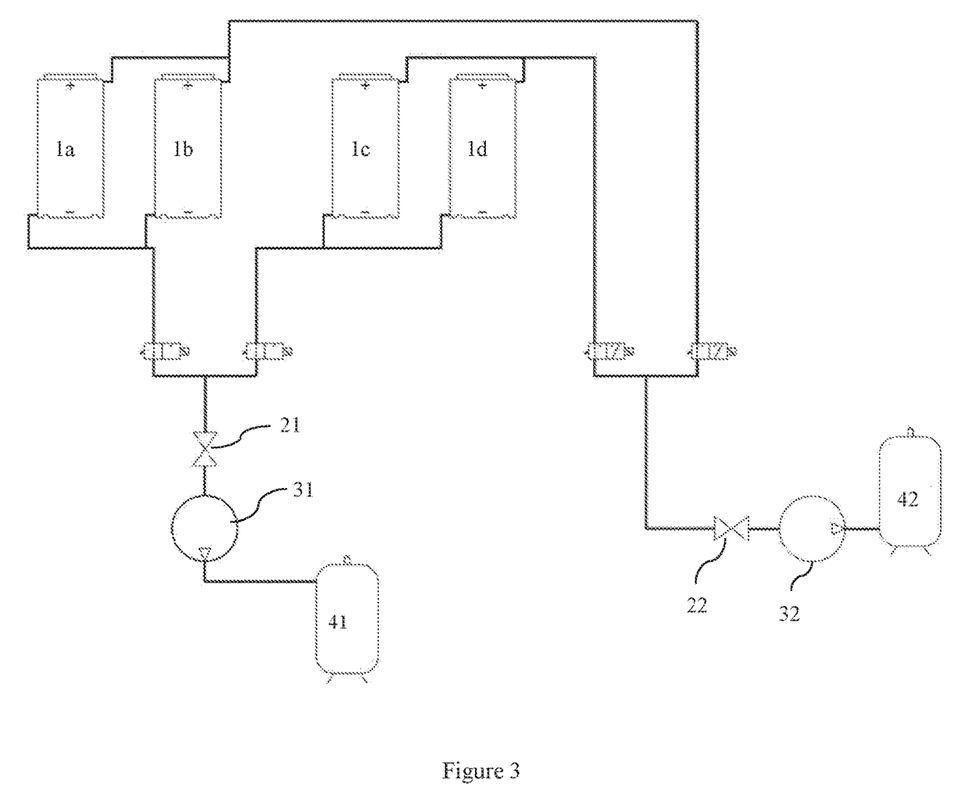
FIG. 3 is a schematic structural view of an electrochemical energy storage device according to yet another embodiment of the present invention.

FIG. 3 is a schematic structural view of an electrochemical energy storage apparatus according to another embodiment of the present invention. As shown in FIG. 3, the major difference between the structure of the said energy storage apparatus and that in the first embodiment is that the electrochemical energy storage apparatus in the present embodiment may include at least one electrochemical energy storage device.

As shown in FIG. 3, the electrochemical energy storage apparatus comprises at least one electrochemical energy storage device comprising a positive electrode, a negative electrode, a separator, an aqueous electrolyte and the container housing the aqueous electrolyte and a plurality of said negative electrode, said positive electrode, and said separator. The said container has an inlet and an outlet that facilitate circulation of fluid entering and exiting said energy storage device; the inlet and outlet of at least one electrochemical energy storage device are set to form fluid passage in the said energy storage device. At least one electrochemical energy storage device may be connected in series or in parallel to form a battery stack to boost capacity and voltage. For example, in the present embodiment, four electrochemical energy storage devices, i.e., electrochemical energy storage devices 1a, 1b, 1c, 1d (for instance, all can be aqueous ion batteries) are used. The electrochemical energy storage devices 1a and 1b are connected in parallel into a first parallel battery pack, the electrochemical energy storage devices 1c and 1d are connected in parallel into a second parallel battery pack, the first pack and the second pack are connected in series, sharing a group of fluid circulation apparatus including pumps, valves, waste liquid reservoirs and new liquid reservoirs. The fluid exchanging control logic is the same as that of a single electrochemical energy storage device.

However, it will be understood by those skilled in the art that the battery stack consisting of at least one electrochemical energy storage device is not limited to the above-said structure, and an array of arbitrary structures consisting of an indefinite number of electrochemical energy storage devices may be used in accordance with the following series-parallel connection: energy storage devices take the first parallel in series to form the battery stack; two or more parallel-connected electrochemical energy storage devices can share a group of pumps, valves, waste liquid reservoirs and new liquid reservoirs; the same group of pumps, valves, waste liquid reservoirs and new liquid reservoirs cannot be shared between any two set of electrochemical energy storage devices that are in series connection.

In the above embodiments, several embodiments of the electrochemical energy storage apparatus based on the present invention have been said. The structure, materials and electrolyte change of the energy storage device in these embodiments will be said in details below.

Figure 4:
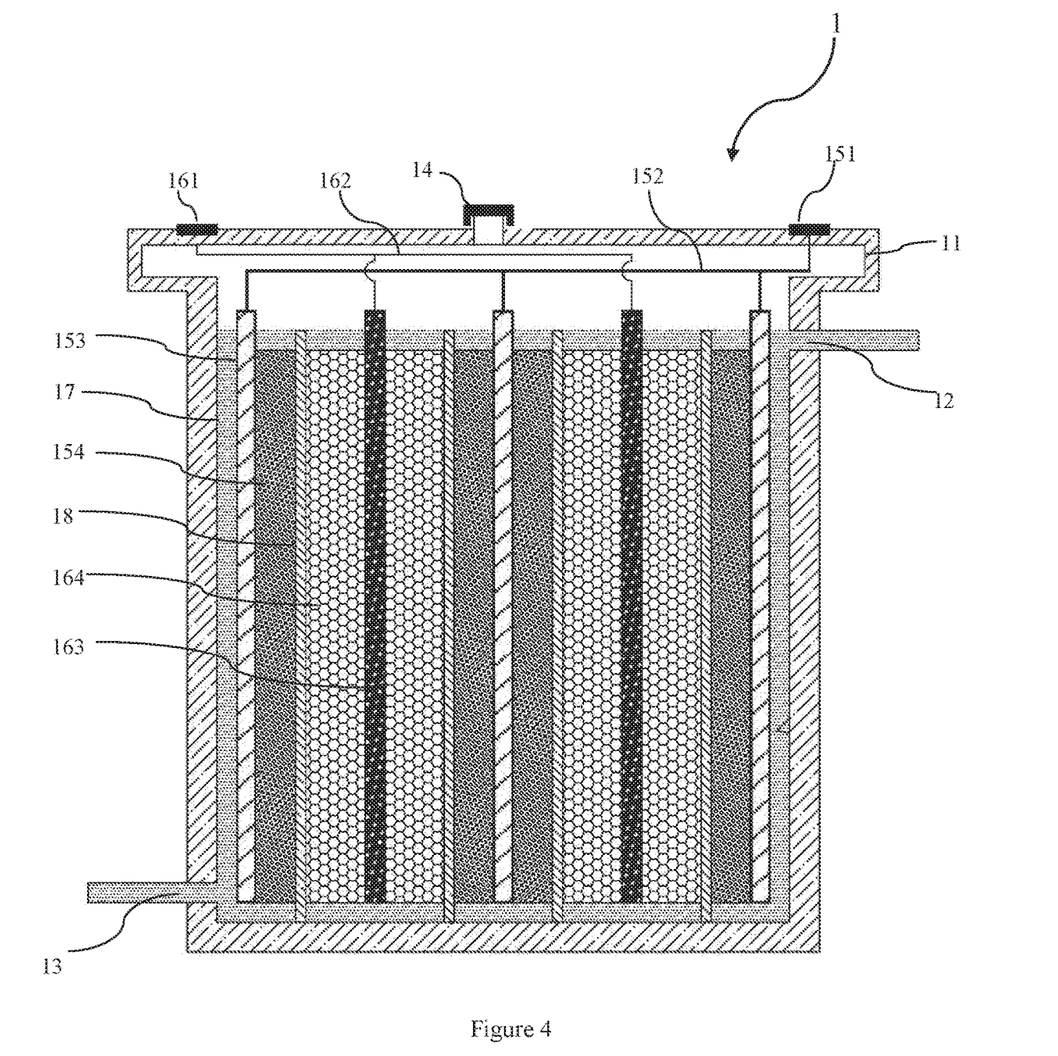
FIG. 4 is a schematic structural view of an electrochemical energy storage device in the electrochemical energy storage apparatus of FIGS. 1 to 3.

FIG. 4 is a schematic structural view of an electrochemical energy storage device of the electrochemical energy storage apparatus of FIGS. 1 to 3. As shown in FIG. 4, the electrochemical energy storage device 1 (for example, an aqueous ion battery) may include a positive electrode, a negative electrode, a separator 18, an aqueous electrolyte 17, and a container 11 housing aqueous electrolyte and a plurality of said negative electrode, said positive electrode, and said separator, the container 11 has an inlet 12 and a outlet 13 (for example, the inlet 12 is provided at the upper portion of the container 11 and the outlet 13 is provided at the lower portion of the container 11) for circulating the fluid in and out of energy storage device. In FIG. 4, the electrochemical energy storage device 1 may also have a relief valve 14; the positive electrode may be composed of, for example, a positive electrode current collector 153, a positive electrode active material 154, a positive electrode bus bar 152, and a positive electrode terminal 151; the negative electrode may be composed of, for example, a negative electrode current collector 163, a negative electrode active material 164, a negative electrode bus bar 162, and a negative electrode terminal 161. The positive electrode active materials and/or the negative electrode active materials comprise at least one material that is capable of intercalating and deintercalating ions in aqueous electrolyte. The electrolyte 17 may flow freely inside and outside the container 11. However, it will be understood by those skilled in the art that the electrochemical energy storage device is not limited to the construction of the above aqueous ion battery, and the positive and negative electrodes may be provided in accordance with other different structures in the art.

For example, the active materials of the negative electrode may be selected from one or more of transition metal oxides, transition metal phosphates, transition metal sulfates, transition metal carbonates, transition metal silicates, transition metals and transition metal alloys, and carbon materials with various degrees of graphitization, various ranges of surface area, and various nano-structures and morphologies. The carbon materials may include one or more of graphite, carbon black, activated carbon, carbon fiber, carbon nanotubes and graphene. The active materials of the negative electrode may contain materials (e.g., transition metal oxides, transition metal phosphates, transition metal sulfates, transition metal carbonates, and transition metal silicates, modified graphite materials) capable of intercalating and deintercalating ions in aqueous electrolyte. The active materials of the negative electrode may include inorganic or organic materials capable of reversible redox reaction. The active materials of the negative electrode also include those that are capable of faradic pseudo-capacitive or nonfaradic capacitive reactions (such as oxides and carbon materials).

The active materials of positive electrode may be selected from one or more of transition metal oxides, transition metal phosphates, transition metal sulfates, transition metal carbonates and transition metal silicates, and carbon materials with various degrees of graphitization, various ranges of surface area, and various nano-structures and morphologies. The carbon materials may include one or more of graphite, hard carbon, soft carbon, carbon black, activated carbon, carbon fiber, carbon nanotubes and graphene. The positive active material comprises at least one material capable of intercalating and deintercalating ions in an aqueous electrolyte, the ions include but are not limited to at least one of $Li^+$, $NH_4^+$, $Na^+$, $K^+$, $Mg^{2+}$, $Zn^{2+}$, $Al^{3+}$ or complex ions formed by metal ions and ligands. The active materials of the positive electrode may contain materials (e.g., transition metal oxides, transition metal phosphates, transition metal sulfates, transition metal carbonates, transition metal silicates, modified graphite materials) capable of intercalating and deintercalating ions in aqueous electrolyte. The active materials of the positive electrode may include inorganic or organic materials capable of reversible redox reaction. The active materials of the positive electrode also include those that are capable of faradic pseudo-capacitive or nonfaradic capacitive reactions (such as oxides and carbon materials).

The aqueous electrolyte used in the electrochemical energy storage device 1 may comprise at least one of dissolved lithium salt, ammonium salt, sodium salt, potassium salt, magnesium salt, zinc salt, aluminum salt, or ligand salt. The pH of the electrolyte should generally be in the range of 4-10, preferably from 5 to 9, more preferably from 6 to 8. The said aqueous electrolyte comprises buffer agent stabilizing pH of said aqueous electrolyte.

Implement Example 1

For example, the positive electrode active material 154 may employ commercially available $LiMn_2O_4$. The positive electrode material was uniformly mixed in accordance with the mass ratio of $LiMn_2O_4$:acetylene black:PTFE binder=80:10:10, and after drying, the mixture was rolled or flattened onto a corrosion-resistant metal positive electrode current collector 153 to prepare a positive electrode sheet. The negative electrode active material 164 employed $LiTi_2(PO_4)_3$ and was uniformly mixed according to the mass ratio of $LiTi_2(PO_4)_3$:conductive carbon black:PTFE binder=80:10:10, and after drying, the mixture was rolled or flattened onto a corrosion-resistant metal negative electrode current collector 163 to form a negative electrode sheet. $Li_2SO_4$ electrolyte was prepared by using analytically pure raw materials, and the pH of the electrolyte was adjusted to 7.10 with LiOH. The positive and negative electrodes were cut according to the specifications, and the hydrophilic-treated PP-based separator 18 and the above-said electrolyte 17 were used, the positive and negative electrodes were paired to form an electrochemical energy storage device (e.g., a battery). In the working voltage range of 1.0-1.8V, the charge-discharge cycle was tested with 1 C current intensity. The initial capacity was 28 Ah, the initial efficiency was 79.4% and the average voltage was 1.51V. The capacity was attenuated by 5% and 12% respectively after 100 and 300 cycles. Measure the concentration of metal ions in the electrolyte, such as Fe, Ni, Zn, Mn and other metal ions by ICP, the concentration of Ni ion at the initial was 0.1 mg/L, the concentration of other three was 0.01 mg/L respectively. After 100 cycles, the concentration of all metal ions increased, the concentration of Fe ion increased by about 40 times, up to 0.42 mg/L, Mn increased by 11 times, at least 0.11 mg/L; after 300 cycles, Ni increased to 5.80 mg/L, Mn increased to 0.32 mg/L, Fe and Zn increased to 0.97 mg/L and 0.47 mg/L respectively. And the pH of the electrolyte increased from the initial 7.10 to 8.37 after 100 cycles, and 8.80 after 300 cycles, indicating that a hydrogen evolution reaction occurs at the battery negative electrode, decomposition of electrolyte produces and exhausts gas, resulting in the decrease in battery quality by 0.10% and 0.25% respectively after 100 cycles and 300 cycles.

See detailed data in Table 1

Implement Example 2

Replace the fresh electrolyte with the external electrolyte circulation apparatus for the battery in Example 1 after circulating 300 cycles, measure the metal ion concentration of the replaced electrolyte by ICP. The metal ion concentration (Fe, Ni, Zn, Mn and the like) was changed to the range of 0.01-0.10 mg/L, restored to the initial state; pH of electrolyte is 7.36, close to the initial state. In the 1.0-1.8V operating voltage range, with the 1 C current intensity charge-discharge cycle was tested, the battery capacity increased from 24.6 Ah (before replacement) to 26.8 Ah, attenuation compared to the first time was only 4%. See detailed data in Table 1.

TABLE 1

Aqueous electrochemical energy storage device electrolyte status and capacity changes.

| Items | ICP(mg/L) | | | | pH | electrochemical energy storage device quality change | electrochemical energy storage device quality change |
| --- | --- | --- | --- | --- | --- | --- | --- |
| | Fe | Ni | Zn | Mn | | | |
| Electrolyte initial | 0.01 | 0.10 | 0.01 | 0.01 | 7.10 | 0 | 0 |
| After 100 cycles | 0.42 | 2.42 | 0.13 | 0.11 | 8.37 | 0.10% | 5% |
| After 300 cycles | 0.97 | 5.80 | 0.45 | 0.32 | 8.80 | 0.25% | 12% |
| Replace Electrolyte | 0.01 | 0.10 | 0.01 | 0.01 | 7.36 | / | 4% |

It should be understood by those skilled in the art that various modifications may be made to the invention and equivalents may be substituted without departing from the spirit of the invention. Accordingly, the claimed subject matter is not to be limited to the specific embodiments disclosed above, but may include all technical solutions falling within the scope of the claims and the same technical solutions therewith. Furthermore, in the claims, all terms should be understood in the broadest sense unless otherwise indicated.

We claim:

1. A secondary electrochemical energy storage apparatus, comprising an energy storage device and a fluid circulation apparatus wherein:

the energy storage device comprises a positive electrode, a negative electrode, a separator, an aqueous electrolyte and a container housing the aqueous electrolyte, the negative electrode, the positive electrode, and the separator, wherein the positive electrode and/or negative electrode comprises an active material capable of intercalating and deintercalating ions in the aqueous electrolyte; and the container has an inlet and an outlet that facilitate circulation of fluid entering and exiting the container, and the fluid circulation apparatus comprises a pump, at least one reservoir, and pipes fluidly connected to the inlet and the outlet, wherein the fluid circulation apparatus is capable of circulating fluid between the reservoir and the container, and the reservoir comprises an up-stream reservoir and a down-stream reservoir.

2. The energy storage apparatus of claim 1, comprising valves set at the inlet and outlet of the container for controlling on and off of the inlet and outlet.

3. The energy storage apparatus of claim 2, wherein the valves for controlling on and off of said inlet and said outlet and the fluid circulation apparatus are operated periodically with a pre-determined time period.

4. The energy storage apparatus of claim 2, comprising:

a sensor for detecting the conditions of the aqueous electrolyte in the container; and an intelligent controlling system configured to trigger the on and off of the inlet and outlet and the operation of the fluid circulation apparatus.

5. The energy storage apparatus of claim 4, wherein the sensor includes a pressure sensor, a temperature sensor, a level sensor, and/or an electrolyte electrochemical analyzer.

6. The energy storage apparatus of claim 1, wherein said negative electrode of said energy storage device comprises an active material selected from the group consisting of transition metal oxides, transition metal phosphates, transition metal sulfates, transition metal carbonates, transition metal silicates, transition metals, transition metal alloys, and carbonaceous materials.

7. The energy storage apparatus of claim 1, wherein said positive electrode of said energy storage device comprises an active material selected from the group consisting of transition metal oxides, transition metal phosphates, transition metal sulfates, and carbonaceous materials.

8. The energy storage apparatus of claim 1, wherein said negative electrode and/or said positive electrode of said energy storage device comprise an active material capable of electrochemical reversible redox reaction.

9. The energy storage apparatus of claim 1, wherein said negative electrode and/or said positive electrode of said energy storage device comprises an active material capable of faradic pseudocapacitive reaction or nonfaradic capacitive reaction.

10. The energy storage apparatus of claim 1, wherein said ions comprise at least one of $Li^+$, $Na^+$, $K^+$, $Mg^{2+}$, $Zn^{2+}$, $Al^{3+}$, or complex ions formed by metal ions and ligands.

11. The energy storage apparatus of claim 1, wherein said aqueous electrolyte comprises at least one of dissolved lithium salt, sodium salt, potassium salt, magnesium salt, zinc salt, or aluminum salt.

12. The energy storage apparatus of claim 1, wherein said aqueous electrolyte has a pH ranging from 4 to 10.

13. The energy storage apparatus of claim 1, wherein said aqueous electrolyte comprises a buffer agent stabilizing pH of said aqueous electrolyte.

14. A secondary energy storage apparatus, comprising at least one energy storage device, comprising a positive electrode, a negative electrode, a separator, an aqueous electrolyte, and a container housing the aqueous electrolyte and said negative electrode, said positive electrode, and said separator, wherein said positive electrode and/or negative electrode comprises an active material capable of intercalating and deintercalating ions in the aqueous electrolyte; said container has an inlet and an outlet that facilitate circulation of fluid entering and exiting said container to renew the aqueous electrolyte in the container; the inlet and outlet of the at least one said electrochemical energy storage device are set as fluid pathway in the said electrochemical energy storage apparatus.

15. The energy storage apparatus in claim 1, wherein said aqueous electrolyte has a pH ranging from 5 to 9.

16. The energy storage apparatus in claim 1, wherein said aqueous electrolyte has a pH ranging from 6 to 8.

* * * * *

UNITED STATES PATENT AND TRADEMARK OFFICE
CERTIFICATE OF CORRECTION

PATENT NO. : 10,797,300 B2
APPLICATION NO. : 15/574649
DATED : October 6, 2020
INVENTOR(S) : Yong Che et al.

Page 1 of 1

It is certified that error appears in the above-identified patent and that said Letters Patent is hereby corrected as shown below:

In the Claims
Column 13, Line 28, in Claim 1, after "apparatus" insert a --,--;
Column 13, Line 46, in Claim 2, after "outlet" delete "of the container".

Signed and Sealed this
Seventeenth Day of November, 2020

Andrei Iancu
*Director of the United States Patent and Trademark Office*